US009112614B2

(12) United States Patent
Randel et al.

(10) Patent No.: US 9,112,614 B2
(45) Date of Patent: Aug. 18, 2015

(54) CORRECTION OF A LOCAL-OSCILLATOR PHASE ERROR IN A COHERENT OPTICAL RECEIVER

(75) Inventors: Sebastian A. Randel, Aberdeen, NJ (US); Alberto Sierra Noguera, Cornella (ES)

(73) Assignee: Alcatel Lucent, Boulogne-Billancourt (FR)

( * ) Notice: Subject to any disclaimer, the term of this patent is extended or adjusted under 35 U.S.C. 154(b) by 742 days.

(21) Appl. No.: 13/410,747

(22) Filed: Mar. 2, 2012

(65) Prior Publication Data

US 2013/0230312 A1 Sep. 5, 2013

(51) Int. Cl.
*H04B 10/06* (2006.01)
*H04B 10/61* (2013.01)

(52) U.S. Cl.
CPC ............ *H04B 10/611* (2013.01); *H04B 10/612* (2013.01); *H04B 10/6165* (2013.01)

(58) Field of Classification Search
CPC .................................................... H04B 10/6165
USPC .................................................. 398/202–204
See application file for complete search history.

(56) References Cited

U.S. PATENT DOCUMENTS

| | | | |
|---|---|---|---|
| 3,511,963 A | | 5/1970 | Saltzbert |
| 5,049,830 A * | | 9/1991 | Yoshida ........................ 329/306 |
| 6,683,855 B1 | | 1/2004 | Bordogna et al. |
| 7,212,741 B2 | | 5/2007 | Myong et al. |
| 7,266,310 B1 | | 9/2007 | Savory et al. |
| 7,315,575 B2 * | | 1/2008 | Sun et al. ...................... 375/229 |
| 7,382,984 B2 | | 6/2008 | McNicol et al. |
| 7,424,651 B2 | | 9/2008 | Domagala et al. |
| 7,532,820 B2 | | 5/2009 | Aronson |
| 7,570,698 B2 | | 8/2009 | Chimitt et al. |
| 7,570,889 B2 | | 8/2009 | Shastri et al. |
| 7,574,146 B2 | | 8/2009 | Chiang et al. |
| 7,606,498 B1 * | | 10/2009 | Wu et al. ........................ 398/152 |
| 7,609,979 B2 * | | 10/2009 | Taylor ............................ 398/204 |
| 7,734,191 B1 | | 6/2010 | Welch et al. |
| 7,747,169 B2 | | 6/2010 | Koc |
| 7,747,177 B2 | | 6/2010 | Chen et al. |
| 8,064,544 B2 * | | 11/2011 | Li et al. ........................ 375/330 |

(Continued)

OTHER PUBLICATIONS

Timo Pfau "Hardware-Efficient Coherent Digital Receiver Concept with Feedforward Carrier Recovery for M-QAM Constellations", Journal of Lightwave technology, vol. 27, No. 8, Apr. 15, 2009.*

(Continued)

*Primary Examiner* — David Payne
*Assistant Examiner* — Tanya Motsinger
(74) *Attorney, Agent, or Firm* — Mendelsohn, Drucker & Dunleavy, P.C.; Yuri Gruzokov

(57) ABSTRACT

In a representative embodiment, a disclosed receiver of an optical multicarrier offset-quadrature-amplitude-modulated (MC-OQAM) signal is configured to track and compensate for the phase error in the local-oscillator (LO) signal with respect to a carrier wave of a modulated subcarrier of the optical MC-OQAM signal by tracking a minimum of a cost function that is sensitive to crosstalk between in-phase and quadrature components of the modulated subcarrier and/or crosstalk between the modulated subcarrier and at least one other modulated subcarrier of the optical MC-OQAM signal. The receiver can operate based on pure feed-forward processing and compensate the phase error in real time and without relying on pilot symbols or a PLL circuit coupled to the LO source.

20 Claims, 5 Drawing Sheets

(56) References Cited

U.S. PATENT DOCUMENTS

| | | | |
|---|---|---|---|
| 8,331,805 B2* | 12/2012 | Nakashima et al. | 398/208 |
| 8,983,309 B2* | 3/2015 | Harley et al. | 398/206 |
| 2007/0110362 A1* | 5/2007 | Shpantzer et al. | 385/15 |
| 2007/0206963 A1* | 9/2007 | Koc | 398/202 |
| 2007/0297806 A1 | 12/2007 | Kaneda et al. | |
| 2008/0063121 A1 | 3/2008 | Geller et al. | |
| 2008/0152361 A1 | 6/2008 | Chen et al. | |
| 2009/0142076 A1* | 6/2009 | Li et al. | 398/208 |
| 2010/0002810 A1* | 1/2010 | Li et al. | 375/325 |
| 2010/0034186 A1* | 2/2010 | Zhou et al. | 370/344 |
| 2010/0232805 A1* | 9/2010 | Cai | 398/158 |
| 2011/0002689 A1 | 1/2011 | Sano et al. | |
| 2011/0038631 A1 | 2/2011 | Doerr | |
| 2011/0069975 A1* | 3/2011 | Liu et al. | 398/202 |
| 2011/0129038 A1 | 6/2011 | Miyoshi et al. | |
| 2011/0217043 A1* | 9/2011 | Pfau | 398/65 |
| 2011/0318021 A1* | 12/2011 | Zhou | 398/202 |

OTHER PUBLICATIONS

Pfau, Timo et al., "Hardware-Efficient Coherent Dgitial Receiver Concept with Feedforward Carrier Recovery for M-QAM Constellations." Journal of Lightwave Technology, vol. 27, No. 8, 2009, pp. 989-999.*

Vangelista, Lorenzo, et al., "Efficient Implementations and Alternative Architectures for OFDM-OQAM Systems," Transactions on Communications, IEEE, vol. 49, No. 4, Aug. 2002, pp. 664-675.

Pfau, Timo et al., "Hardware-Efficient Coherent Digital Receiver Concept With Feedforward Carrier Recovery for M-QAM Constellations," Journal of Lightwave Technology, vol. 27, No. 8, 2009, pp. 989-999.

Saltzberg, Burton R., "Performance of an Efficient Parallel Data Transmission System," Transactions on Communication Technology, IEEE, vol. 15, No. 6, 1967, pp. 805-811.

Winzer, Peter J., et al., U.S. Appl. No. entitled, "Frequency-Resolved I/Q-Signal Imbalance Correction for Coherent Optical Receivers," U.S. Appl. No. 12/876,489, filed Sep. 7, 2010.

* cited by examiner

400

CORRECTION OF A LOCAL-OSCILLATOR PHASE ERROR IN A COHERENT OPTICAL RECEIVER

BACKGROUND

1. Field of the Invention

The present invention relates to optical communication equipment and, more specifically but not exclusively, to signal processing that can be implemented at a coherent optical receiver of multicarrier offset-quadrature-amplitude-modulation (MC-OQAM) signals.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Delivery of multimedia services (e.g., telephony, digital video, and data) that is implemented using optical phase-shift keying (PSK) or quadrature-amplitude modulation (QAM) signals has certain advantages, e.g., over that implemented using conventional electrical analog or digital signals. As a result, cable and telephone companies and Internet service providers are upgrading their networks to incorporate optical links that can carry these types of optical signals. For example, it is projected that, in the near future, high-definition television signals are likely to be delivered predominantly over optical communication channels.

A typical coherent optical receiver detects a received PSK or QAM signal by mixing it with a local-oscillator (LO) signal and then processing the resulting mixed signals to determine the phase and amplitude of the received signal in each time slot (symbol period), thereby recovering the encoded data. To enable the phase and amplitude determination, the LO signal may be phase-locked to a carrier frequency (wavelength) of the received optical signal using an optical phase-lock loop (PLL). More specifically, a PLL may be configured to track a carrier frequency of the received optical signal and provide a feedback signal to the LO source, based on which the LO source can achieve and maintain the phase lock.

Unfortunately, suitable coherent optical receivers are typically relatively difficult to design and/or relatively expensive to build. For example, a conventional, relatively inexpensive laser source might produce an optical signal that has a relatively large linewidth. If that laser source is used in a coherent optical receiver as a local oscillator, then its relatively large linewidth might produce a phase uncertainty and/or phase noise that can make an optical phase-lock between the LO and communication signals difficult to achieve and/or maintain. As another example, even a laser source having a relatively narrow linewidth may require a fairly complex (and therefore relatively expensive) PLL circuit to function as a local oscillator in a coherent optical receiver.

SUMMARY

Disclosed herein are various embodiments of a coherent optical receiver for an optical multicarrier offset-quadrature-amplitude-modulated (MC-OQAM) signal. In a representative embodiment, a disclosed coherent optical receiver is configured to track and compensate for the phase error in the local-oscillator (LO) signal with respect to a carrier wave of a modulated subcarrier of the optical MC-OQAM signal by tracking a minimum of a cost function that is sensitive to crosstalk between in-phase and quadrature components of the modulated subcarrier and/or crosstalk between the modulated subcarrier and at least one other modulated subcarrier of the optical MC-OQAM signal. Advantageously, the coherent optical receiver can operate based on pure feed-forward processing and compensate the phase error in real time and without relying on pilot symbols or a PLL circuit coupled to the LO source.

According to one embodiment, provided is a receiver for an optical input signal having one or more modulated subcarriers, each modulated by symbols of a QAM constellation over a sequence of symbol periods. The receiver comprises an opto-electrical frontend circuit configured to mix the optical input signal with an optical LO signal to produce an electrical digital measure of the optical input signal for the sequence; and a digital processor being adapted to process the electrical digital measure to recover data carried by each of the modulated subcarriers over the sequence. For at least one of the modulated subcarriers, the digital processor is configured to generate, for each of a plurality of fixed test phases, a respective value of a cost function. The cost function has a magnitude that is sensitive to at least one of (i) crosstalk between in-phase and quadrature components of the modulated subcarrier and (ii) crosstalk between the modulated subcarrier and at least one other modulated subcarrier of the optical input signal, said crosstalk being caused by a phase error in the optical LO signal with respect to a carrier wave of the modulated subcarrier. The digital processor is further configured to select one of the fixed test phases based on the generated values of the cost function; and compensate for the phase error based on the selected test phase.

According to another embodiment, provided is a method of processing an optical input signal having one or more subcarriers, each modulated by symbols of a QAM constellation over a sequence of symbol periods. The method comprises mixing the optical input signal with an optical LO signal to produce an electrical digital measure of the modulated optical signal for the sequence; and processing the electrical digital measure to recover data carried by each of the modulated subcarriers over the sequence. For at least one of the modulated subcarriers, said processing comprises, for each of a plurality of fixed test phases, generating a respective value of a cost function. The cost function has a magnitude that is sensitive to at least one of (i) crosstalk between in-phase and quadrature components of the modulated subcarrier and (ii) crosstalk between the modulated subcarrier and at least one neighboring modulated subcarrier of the optical input signal, said crosstalk being caused by a phase error in the optical LO signal with respect to a carrier wave of the modulated subcarrier. The processing further comprises selecting one of the fixed test phases based on the generated values of the cost function; and compensating for the phase error based on the selected test phase.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
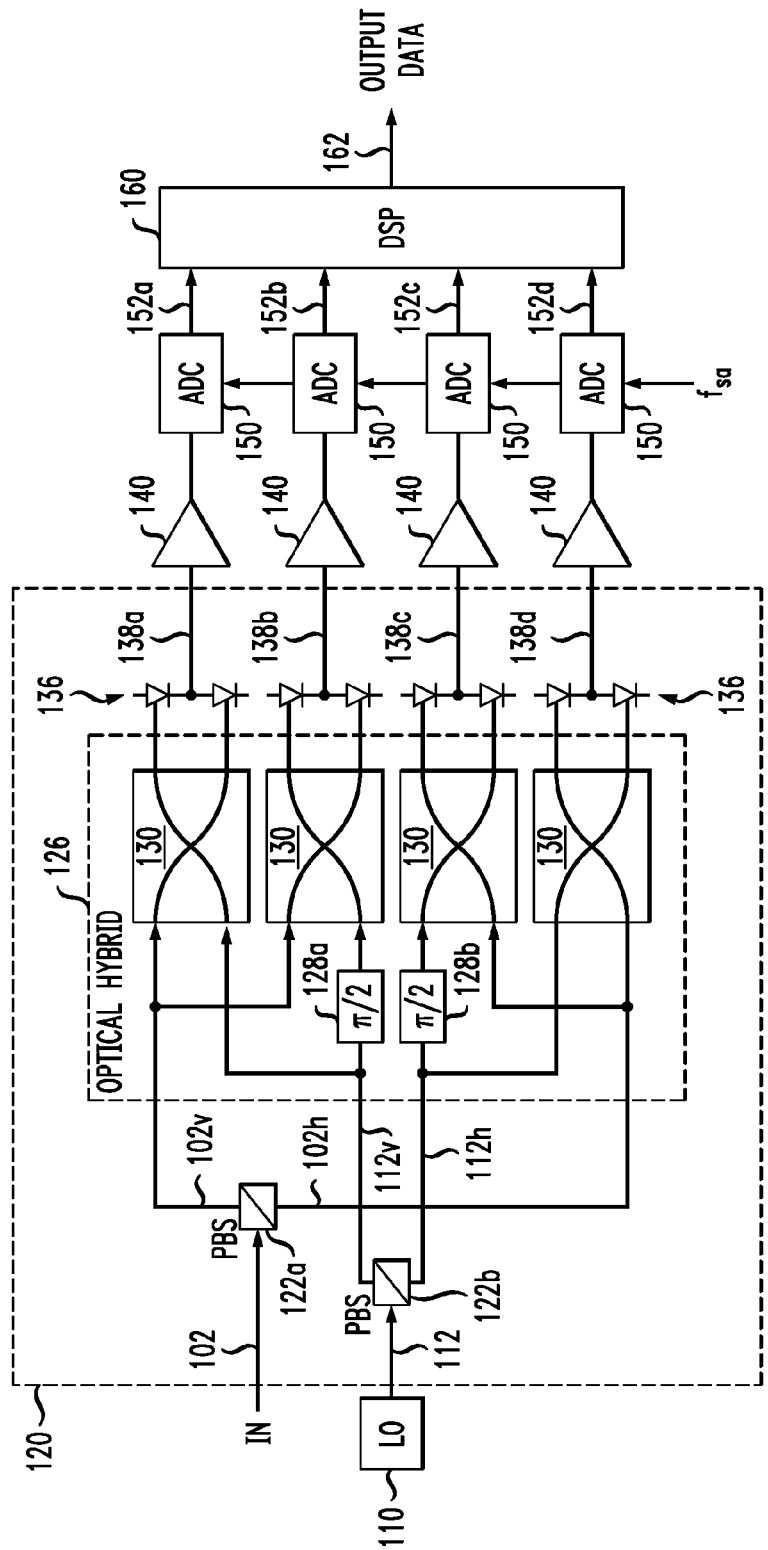
FIG. 1 shows a block diagram of a coherent optical receiver according to one embodiment of the disclosure.

In a representative implementation, a multicarrier offset-quadrature-amplitude-modulation (MC-OQAM) scheme uses 2N+1 coherent subcarriers having a frequency separation that matches the symbol rate $f_s = 1/T_s$, where N is a positive integer and $T_s$ is a symbol period. Each subcarrier is modulated using an M-QAM constellation (e.g., a rectangular or square 16-QAM constellation) so that the real and imaginary components of each symbol are delayed with respect to one another by one half of a symbol period (i.e., by $T_s/2$). For even subcarriers, the real component leads the imaginary component. For odd subcarriers, the imaginary component leads the real component. In the baseband, the corresponding waveform, s(t), can be expressed using Eq. (1):

$$s(t) = \sum_{n=-N}^{N} \sum_{k} \left[ a_n(k) h\left(t - kT_s - \frac{\alpha_n T_s}{2}\right) + j b_n(k) h\left(t - kT_s - \frac{(1-\alpha_n)T_s}{2}\right) \right] \exp\left(j \frac{2\pi n}{T_s} t\right) \quad (1)$$

where t is time; n is the subcarrier index; k is the time-slot index; $a_n(k)$ and $b_n(k)$ are the real and imaginary parts, respectively, of the constellation symbol transmitted on the n-th subcarrier during the k-th time slot; h(t) is a symbol-pulse envelope; and $\alpha_n$ is a coefficient that is 0 for even indices n and 1 for odd indices n. An MC-OQAM scheme that uses an even number of coherent subcarriers can be implemented in a similar manner.

A representative modulator that can be used to generate an optical MC-OQAM signal in accordance with Eq. (1) is disclosed, e.g., in the paper by Lorenzo Vangelista, entitled "Efficient Implementations and Alternative Architectures for OFDM-OQAM Systems," published in IEEE TRANSACTIONS ON COMMUNICATIONS, 2001, vol. 49, No. 4, pp. 664-675, the teachings of which are incorporated herein by reference in their entirety.

After transmission over an optical link, an optical MC-OQAM signal generated in accordance with Eq. (1) may be received and processed at a coherent optical receiver, e.g., as further described below in reference to FIGS. 1-5.

One problem with the detection and processing of optical MC-OQAM signals is that, in the presence of a local-oscillator phase error, the detected signal may have signal impairments that are not encountered in the case of conventional (e.g., single-carrier) optical QAM signals. For example, for a conventional optical QAM signal, a local-oscillator phase error typically causes the perceived QAM constellation to be rotated with respect to the original one (i.e., the QAM constellation used at the transmitter) by an angle proportional to the magnitude of the phase error. The phase error itself does not typically cause an additional scatter of the detected symbols around the corresponding constellation points. In contrast, for an optical MC-OQAM signal, a local-oscillator phase error causes both a rotation of the perceived QAM constellation by an angle proportional to the magnitude of the phase error and an additional scatter of the detected symbols around the corresponding constellation points. The additional scatter is caused by (i) crosstalk between the in-phase (I) and quadrature (Q) components of the same subcarrier and (ii) crosstalk between neighboring modulation-broadened subcarriers. In the phase-error interval between about −90 degrees and about +90 degrees, the magnitude of the additional scatter generally increases as the absolute value of the phase error increases. When the absolute value of the phase error is near 90 degrees, the corresponding subcarrier of the received MC-OQAM signal becomes substantially un-decodable because the crosstalk becomes so large that it overwhelms the information component of the subcarrier.

Because the above-described types of crosstalk are specific to the MC-OQAM format, representative prior-art phase-recovery and phase-error correction methods developed for conventional QAM do not work well and, more typically, completely break down in the case of MC-OQAM signals. Various embodiments of a coherent optical receiver disclosed herein are directed at addressing this and other relevant problems in the prior art. In particular, the present disclosure provides embodiments of a phase-error estimation and compensation scheme that can track and compensate the phase error in real time, during payload-data transmission in the MC-OQAM format, and without relying on pilot symbols or a PLL circuit. For example, if (i) the subcarrier separation accurately matches the symbol rate $f_s$, (ii) orthogonal symbol-pulse envelopes h(t) are employed (also see Eq. (1)), (iii) other signal impairments, such as chromatic dispersion and polarization-mode dispersion, can be sufficiently compensated optically or digitally, and (iv) the optical local-oscillator signal has a carrier frequency that is sufficiently close to the frequency of a selected (e.g., the 0-th) subcarrier of the received MC-OQAM signal, then embodiments disclosed herein may advantageously be used to implement a coherent optical receiver configured to operate without a PLL coupled to the local-oscillator source and/or with a relatively inexpensive laser as the local-oscillator source.

FIG. 1 shows a block diagram of a coherent optical receiver 100 according to one embodiment of the disclosure. Receiver 100 receives a polarization-multiplexed optical MC-OQAM signal 102, e.g., from a remote transmitter, via an external optical communication link (not explicitly shown in FIG. 1). Optical signal 102 is applied to an optical-to-electrical (O/E) converter 120 that converts that optical signal into four electrical signals 138a-138d. Each of signals 138a-138d is amplified in a corresponding amplifier 140 coupled to a corresponding analog-to-digital converter (ADC) 150. Each ADC 150 samples the output of a corresponding amplifier 140 at an appropriate sampling frequency $f_{sa}$ to produce a corresponding one of four digital signals 152a-152d. Digital signals 152a-152d are applied to a digital signal processor (DSP) 160 that processes them, e.g., as described in more detail below in reference to FIGS. 2-5, to recover the data streams originally encoded onto the subcarriers of the two polarization components of optical signal 102 at the remote transmitter. DSP 160 outputs the recovered data via an output signal 162.

In one embodiment, receiver 100 may include a set of electrical low-pass filters (not explicitly shown in FIG. 1), each inserted between O/E converter 120 and the respective one of ADCs 150. The use of these filters may help to reduce noise and prevent aliasing.

O/E converter 120 implements a polarization-sensitive intradyne-detection scheme using an optical local-oscillator (LO) signal 112 generated by a laser source 110. In one embodiment, O/E converter 120 is an integrated planar waveguide circuit. Polarization beam splitters (PBSs) 122a-b decompose signals 102 and 112, respectively, into two respective orthogonally polarized components, illustratively vertically polarized components 102v and 112v and horizontally polarized components 102h and 112h. These polarization components are then directed to an optical hybrid 126.

In optical hybrid 126, each of polarization components 102v, 112v, 102h, and 112h is split into two (attenuated) copies, e.g., using a conventional 3-dB power splitter (not explicitly shown in FIG. 1). A relative phase shift of about 90 degrees ($\pi/2$ radian) is then applied to one copy of component 112v and one copy of component 112h using phase shifters 128a-128b, respectively. The various copies of signals 102v, 112v, 102h, and 112h are optically mixed with each other as shown in FIG. 1 using four optical signal mixers 130, and the mixed signals produced by the mixers are detected by eight photo-detectors (e.g., photodiodes) 136. Photo-detectors 136 are arranged in pairs, as shown in FIG. 1, and the output of each photo-detector pair is a corresponding one of electrical signals 138a-138d. This configuration of photo-detectors 136 is a differential configuration that helps to reduce noise and improve DC balancing. In an alternative embodiment, O/E converter 120 can have four photo-detectors 136, one per optical signal mixer 130, configured for single-ended detection of the corresponding optical signals.

Exemplary optical hybrids that are suitable for use in optical receiver 100 are described, e.g., in U.S. Patent Application Publication Nos. 2007/0297806 and 2011/0038631, both of which are incorporated herein by reference in their entirety.

In a representative embodiment, DSP 160 performs (i) signal equalization and (ii) carrier- and data-recovery (CDR) processing. Signal equalization is generally directed at reducing the detrimental effects of various signal impairments imparted onto optical signal 102 in the optical link. Such signal impairments might include, but are not limited to polarization distortion (PD), chromatic dispersion (CD), polarization-mode dispersion (PMD), additive noise, and spectral distortion. One skilled in the art will appreciate that these signal impairments might accrue in the optical link through either localized or distributed mechanisms, or through a combination of both types of mechanisms. The CDR processing is generally directed at reducing the detrimental effects of phase noise and/or local-oscillator phase error to enable receiver 100 to recover the transmitted data with a relatively low BER.

Figure 2:
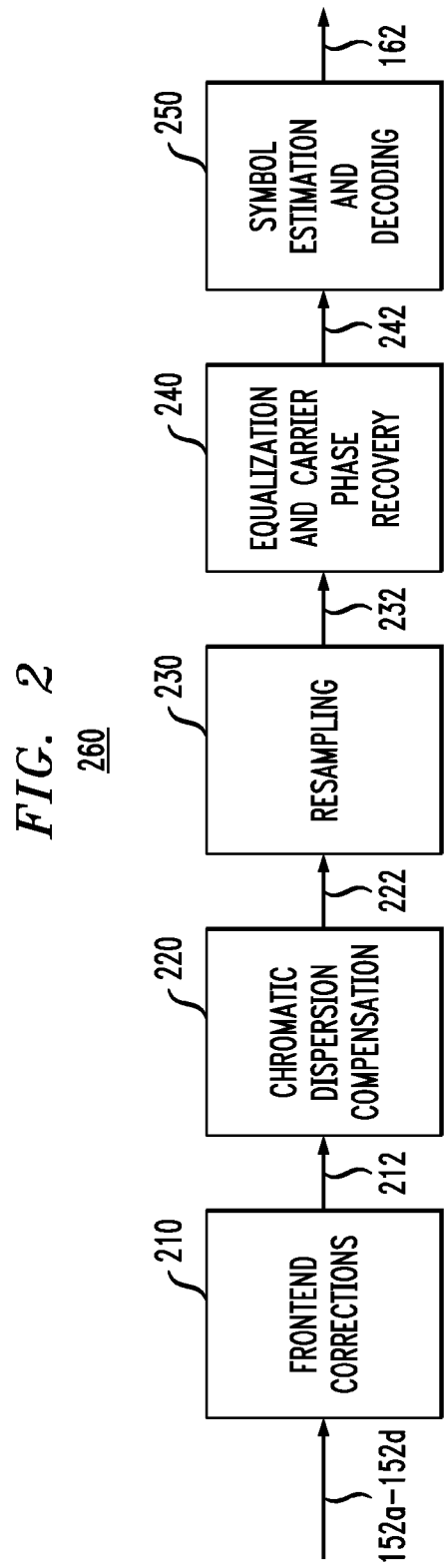
FIG. 2 shows a block diagram of a digital signal processor (DSP) that can be used in the coherent optical receiver of FIG. 1 according to one embodiment of the disclosure.

FIG. 2 shows a block diagram of a DSP 260 that can be used to implement DSP 160 according to one embodiment of the disclosure. DSP 260 is illustratively shown in FIG. 2 as receiving digital signals 152a-152d (also see FIG. 1). DSP 260 processes digital signals 152a-152d as further described below to generate output signal 162 (also see FIG. 1).

Ideally, digital signals 152a-152b represent the I and Q components, respectively, of the first polarization component of the original optical communication signal generated by the remote transmitter, and digital signals 152c-152d represent the I and Q components, respectively, of the second polarization component of that optical communication signal. However, optical-link impairments and receiver-implementation imperfections generally cause each of digital signals 152a-152d to be a convoluted signal that has various signal distortions and/or contributions from both original polarization components. The train of signal processing implemented in DSP 260 is generally directed at de-convolving digital signals 152a-152d so that the encoded data can be properly recovered to generate output signal 162.

DSP 260 has a frontend-correction module 210 that is configured to receive digital signals 152a-152d and process these signals to reduce signal distortions imposed by O/E converter 120 (see FIG. 1). Said distortions may be caused, e.g., by incorrect biasing of various electro-optical components of O/E converter 120; imperfect signal splitting in power and polarization splitters and optical couplers; frequency dependence and variability of the O/E conversion characteristics of photo-detectors 136, etc. Representative signal processing that can be implemented in frontend-correction module 210 is disclosed, e.g., in U.S. patent application Ser. No. 12/876,489, filed on Sep. 7, 2010, and entitled "FREQUENCY-DEPENDENT I/Q-SIGNAL IMBALANCE CORRECTION FOR COHERENT OPTICAL TRANSCEIVERS," which is incorporated herein by reference in its entirety.

A plurality of signals 212 generated by frontend-correction module 210 is applied to a chromatic-dispersion-compensation (CDC) module 220. CDC module 220 is configured to perform signal processing that mitigates detrimental effects of chromatic dispersion imposed on optical input signal 102 (see FIG. 1) by the optical link that feeds receiver 100. Various CDC modules that can be used to implement CDC module 220 are disclosed, e.g., in U.S. Pat. Nos. 7,570,889, 7,532,820, and 7,382,984, all of which are incorporated herein by reference in their entirety.

A plurality of signals 222 generated by CDC module 220 is applied to a re-sampling module 230. In a representative embodiment, each of signals 222 is a stream of digital samples that occur at a rate corresponding to the sampling frequency $f_{sa}$, at which ADCs 150 generate digital samples for digital signals 152a-152d (see FIG. 1). Re-sampling module 230 operates to resample signals 222 to generate a plurality of signals 232 in which digital samples occur at a rate of $2f_s$ (i.e., double the symbol rate in optical input signal 102, FIG. 1).

The plurality of signals 232 is applied to equalization and carrier-recovery (ECR) module 240. ECR module 240 is configured to perform signal processing that mitigates detrimental effects of dynamic optical-link impairments (such as polarization rotation and polarization-mode dispersion), the carrier-frequency mismatch between LO signal 112 and the individual subcarriers of input optical signal 102, and the local-oscillator phase error.

For example, ECR module 240 may perform electronic polarization de-multiplexing, which is needed when the orientation of the principal polarization axes of PBS 122a (FIG. 1) differs from the orientation of the principal polarization components of optical input signal 102. Various signal-processing techniques that can be used for this purpose in ECR module 240 are disclosed, e.g., in U.S. Pat. Nos. 7,747,169, 7,315,575, and 7,266,310, all of which are incorporated herein by reference in their entirety.

Electronic compensation of the mismatch between the frequency of an individual subcarrier and the frequency of LO signal 112 is needed for each subcarrier of optical input signal 102, e.g., because optical input signal 102 has multiple subcarriers while LO signal 112 may have only a single carrier frequency (also see Eq. (1) and FIG. 1). Various signal-processing techniques that can be used to implement frequency-mismatch compensation in ECR module 240 are disclosed, e.g., in U.S. Pat. No. 7,747,177 and U.S. Patent Application Publication No. 2008/0152361, both of which are incorporated herein by reference in their entirety.

As already indicated above, the phase-error correction implemented in ECR module 240 enables receiver 100 to reduce crosstalk between the I and Q components of the same subcarrier and crosstalk between neighboring subcarriers of optical input signal 102. Representative signal-processing techniques that can be used to implement phase-error correction in ECR module 240 according to various embodiments of the present disclosure are described in more detail below in reference to FIGS. 3-5.

A plurality of signals 242 generated by ECR module 240 is applied to a symbol-estimation and decoding (SED) module 250. For each subcarrier of optical input signal 102, SED module 250 is configured to use the complex values conveyed by signals 242 to appropriately map each corresponding symbol onto the operative QAM constellation and, based on said mapping, recover the corresponding encoded data for output signal 162.

In one embodiment, SED module 250 may perform digital processing that implements forward error correction (FEC) based on data redundancies in optical input signal 102. Many FEC methods suitable for use in SED module 250 are known in the art. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

Figure 3:
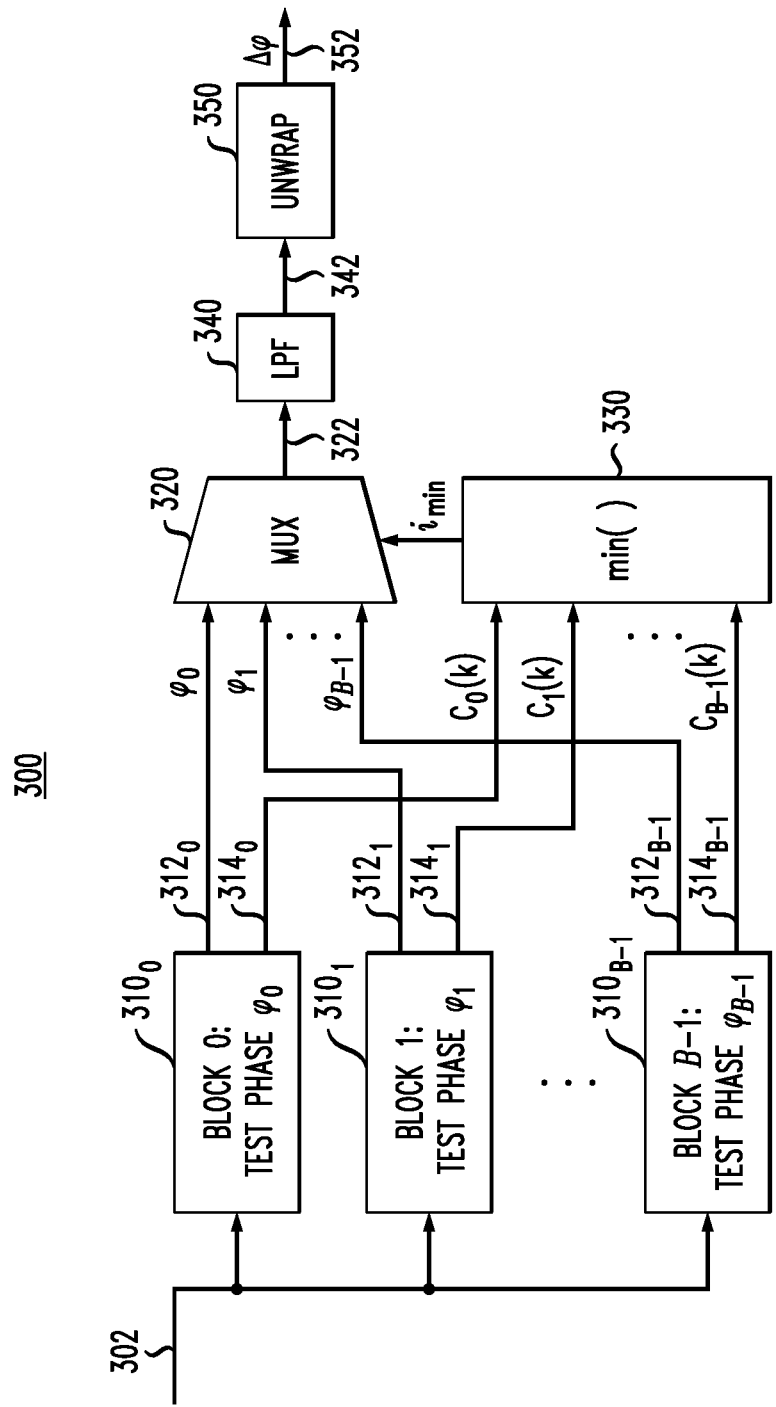
FIG. 3 shows a block diagram of a phase-error estimation (PEE) circuit that can be used in the DSP of FIG. 2 according to one embodiment of the disclosure.

FIG. 3 shows a block diagram of a phase-error estimation (PEE) circuit 300 that can be used in ECR module 240 (FIG. 2) according to one embodiment of the disclosure. More specifically, PEE circuit 300 is configured to determine a phase-error correction value ($\Delta\phi$) for ECR module 240 to apply to a corresponding single subcarrier. Consequently, in some embodiments, ECR module 240 may employ several instances of PEE circuit 300, for example, configured so that each such circuit determines a respective $\Delta\phi$ value for a respective one of the subcarriers. Note that PEE circuit 300 uses a pure feed-forward approach to phase-error estimation.

As indicated in FIG. 3, PEE circuit 300 has B test-phase modules 310, which are labeled $310_0$-$310_{B-1}$, where B is an integer greater than 1. In general, the value of B determines the granularity of phase-error estimation, wherein larger B values produce smaller granularity. The choice of B may also depend on the size of the operative QAM constellation, wherein larger B values tend to be used for larger constellations.

Each of test-phase modules $310_0$-$310_{B-1}$ receives, as an input, a copy of a digital signal 302 that carries complex values corresponding to the subcarrier that PEE circuit 300 is configured to handle. As already indicated above in reference to FIG. 2, in the process of generating digital signal 302, ECR module 240 may perform signal processing that mitigates the detrimental effects of dynamic optical-link impairments, etc.

Each test-phase module $310_i$ (where i=0, 1, . . . , B−1) is configured to use a respective fixed test-phase value ($\phi_i$) as a guess of the magnitude of possible phase error in signal 302. In a representative configuration, the plurality of test phases used by different test-phase modules 310 are selected from an interval between −90 degrees and +90 degrees according to Eq. (2):

$$\varphi_i = -\frac{\pi}{2} + i\frac{\pi}{B-1} \quad (2)$$

In other configurations, other test-phase selection schemes may similarly be used. Each test-phase module $310_i$ is configured to provide, via a digital signal $312_i$, its value of $\phi_i$ to a multiplexer (MUX) 320, e.g., as indicated in FIG. 3.

Each test-phase module $310_i$ is further configured to use the copy of signal 302 that it receives to calculate, in each time slot, the corresponding value (denoted $C_i(k)$) of a cost function C. Each test-phase module $310_i$ is also configured to apply, via a digital signal $314_i$, the calculated value of $C_i(k)$ to a MUX-control circuit 330. A representative cost function used in test-phase modules 310 and the corresponding signal processing are described below in reference to FIGS. 4 and 5. In general, a suitable cost function for use in a test-phase module 310 is designed to provide a measure of how well the different test-phase values $\phi_i$ approximate the actual phase error in signal 302.

In each time slot, MUX-control module 330 sorts the values of $C_i(k)$ that it receives via digital signals $314_0$-$314_{B-1}$ and determines the optimal one of said values. Depending on the cost function implemented in test-phase modules 310, the optimal value can be, e.g., the smallest value or the largest value. Eq. (3) provides an expression of the sorting function performed by MUX-control module 330 in mathematical terms when the optimal value is the smallest value:

$$C_{i_{min}}(k) = \min_{0 \leq i \leq B-1} C_i(k) \quad (3)$$

where $i_{min}$ is the value of index i corresponding to the smallest value of $C_i(k)$. MUX-control module 330 then configures MUX 320 to select its $i_{min}$-th input signal (i.e., signal $312_{i_{min}}$) and output that signal as an output signal 322. Since the value of $i_{min}$ may change from time slot to time slot, MUX 320 may cause output signal 322 to change accordingly.

An optional digital low-pass filter (LPF) 340 is configured to filter output signal 322 to generate a filtered digital signal 342. One purpose of this low-pass filtering is to effectively time-average the phase-error estimate generated as described above over a sliding, fixed-width time window. Since a typical phase error observed in an optical receiver, such as receiver 100, may evolve relatively slowly over time, the low-pass filtering provided by LPF 340 may help PEE circuit 300 to track the phase error more accurately.

An unwrap circuit 350 is configured to process digital signal 342 (or digital signal 322, if LPF 340 is omitted) to generate an output signal 352 that provides an estimate of the current phase error ($\Delta\phi$) that can then be used in ECR module 240 to correct the phase error in signal 302. More specifically, circuit 350 operates to remove sudden phase jumps that can be caused by the limited range of the test phases used in test-phase modules $310_0$-$310_{B-1}$. For example, when the phase error approaches and then exceeds +90 degrees, signal 322 may exhibit a phase jump of about −180 degrees, e.g., from about +90 degrees to about −90 degrees. However, a typical phase error observed in an optical receiver, such as receiver 100, tends to change continuously over time (e.g., without sudden jumps) and is not limited to any particular range, such as the range of test phases used in test-phase modules $310_0$-$310_{B-1}$. Unwrap circuit 350 operates to correct the signal-processing artifact that manifests itself as sudden phase jumps, e.g., by adding an appropriate phase value to that of signal 342 (or of signal 322). One skilled in the art will appreciate that the added phase value may change over time and generally is an integer multiple of 180 degrees.

To detect relatively large phase jumps in signal 322 or 342, unwrap circuit 350 may be configured to determine the phase increment, e.g., from the previous time slot to the present one, and compare the determined phase increment to a specified threshold value. If the phase increment is smaller than the threshold value, then no artificial phase jump is detected, and unwrap circuit 350 does not change the current correction value that is being applied to signal 322 or 342. However, if the phase increment is greater than the threshold value, then unwrap circuit 350 may adjust the correction value applied to signal 322 or 342 accordingly, e.g., by increasing or decreasing it by 180 degrees.

Figure 4:
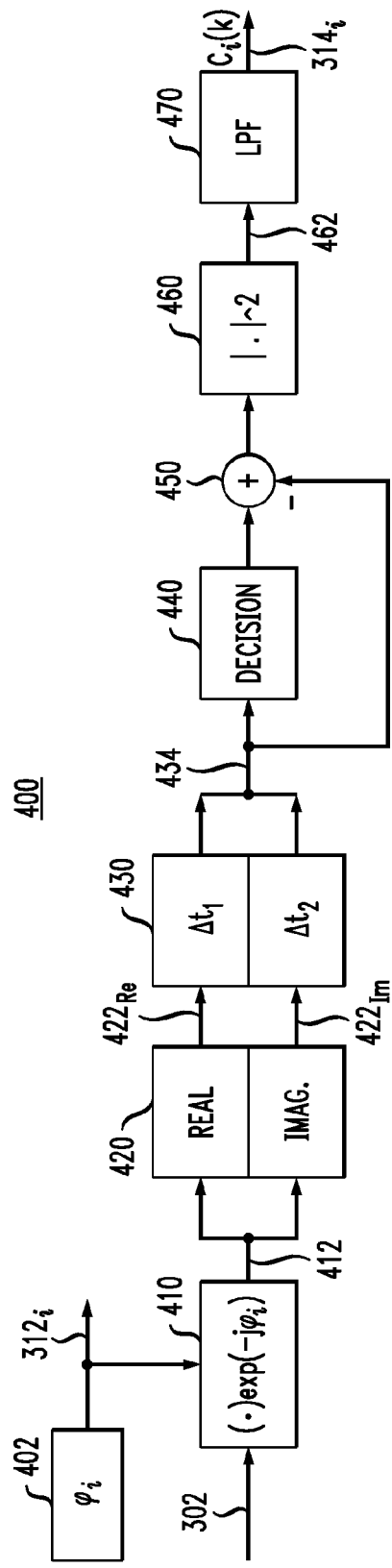
FIG. 4 shows a block diagram of a test-phase module that can be used in the PEE circuit of FIG. 3 according to one embodiment of the disclosure.

FIG. 4 shows a block diagram of a circuit 400 that can be used to implement test-phase module 310$_i$ (FIG. 3) according to one embodiment of the disclosure. For illustration purposes, circuit 400 is shown as receiving input signal 302 and generating output signals 312$_i$ and 314$_i$ (also see FIG. 3). As already indicated above, index i can be 0, 1, . . . , or B−1.

Circuit 400 has a memory cell 402 configured to store test-phase value $\phi_i$, which has been generated, for example, according to Eq. (2). Memory cell 402 is further configured to provide the test-phase value stored therein to external circuitry, e.g., via output signal 312$_i$. A copy of signal 312$_i$ is also applied to a multiplier 410, as indicated in FIG. 4.

Multiplier 410 is configured to receive a stream of complex values provided by digital signal 302 (also see FIG. 3) and multiply each complex value by exponential factor $\exp(-j\phi_i)$. The resulting stream of complex values is applied, via a digital signal 412, to a complex-number separator 420. Separator 420 is configured to split each complex value carried by signal 412 into the corresponding real and imaginary parts. Separator 420 then places the real parts into a digital stream 422$_{Re}$, and the imaginary parts into a digital stream 422$_{Im}$.

Digital streams 422$_{Re}$ and 422$_{Im}$ are applied to a delay circuit 430. Delay circuit 430 comprises two delay lines characterized by delay times $\Delta t_1$ and $\Delta t_2$, respectively, and configured to delay streams 422$_{Re}$ and 422$_{Im}$ with respect to one another by one half of a symbol period (i.e., by $T_s/2$). The sign of the relative delay imposed by delay circuit 430 depends on the subcarrier index n of the subcarrier that is being processed by the corresponding PEE circuit 300 having circuit 400 as one of its test-phase modules 310 (also see Eq. (1) and FIG. 3). More specifically, $\Delta t_1 - \Delta t_2 = +T_s/2$ for even n; and $\Delta t_1 - \Delta t_2 = -T_s/2$ for odd n. Streams 422$_{Re}$ and 422$_{Im}$ time-shifted in this manner by delay circuit 430 are then recombined to form a stream 434 of complex values. More specifically, each complex value in stream 434 is formed by a pair of synchronous values provided by delayed streams 422$_{Re}$ and 422$_{Im}$, wherein the value provided by delayed stream 422$_{Re}$ is the real part of said complex value, and the value provided by delayed stream 422$_{Im}$ is the imaginary part of said complex value.

Each complex value carried by stream 434 is applied to a decision circuit 440, which maps the complex value onto the operative QAM constellation to determine a corresponding trial constellation symbol. An adder 450 then subtracts the complex value of stream 434 from the corresponding trial constellation symbol generated by decision circuit 440 to determine the separation between them on the complex plane. A distance calculator 460 then multiplies the complex value received from adder 450 by its complex conjugate, thereby calculating the square of the distance between the complex value carried by stream 434 and the corresponding trial constellation symbol generated decision circuit 440.

The squared distances calculated by distance calculator 460 are applied, via a digital signal 462, to a digital LPF 470, which generates digital signal 314. More specifically, LPF 470 filters digital signal 462, e.g., to time-average and/or remove noise distortions. The resulting filtered digital signal carries a stream of cost-function values $C_i(k)$.

Figure 5:
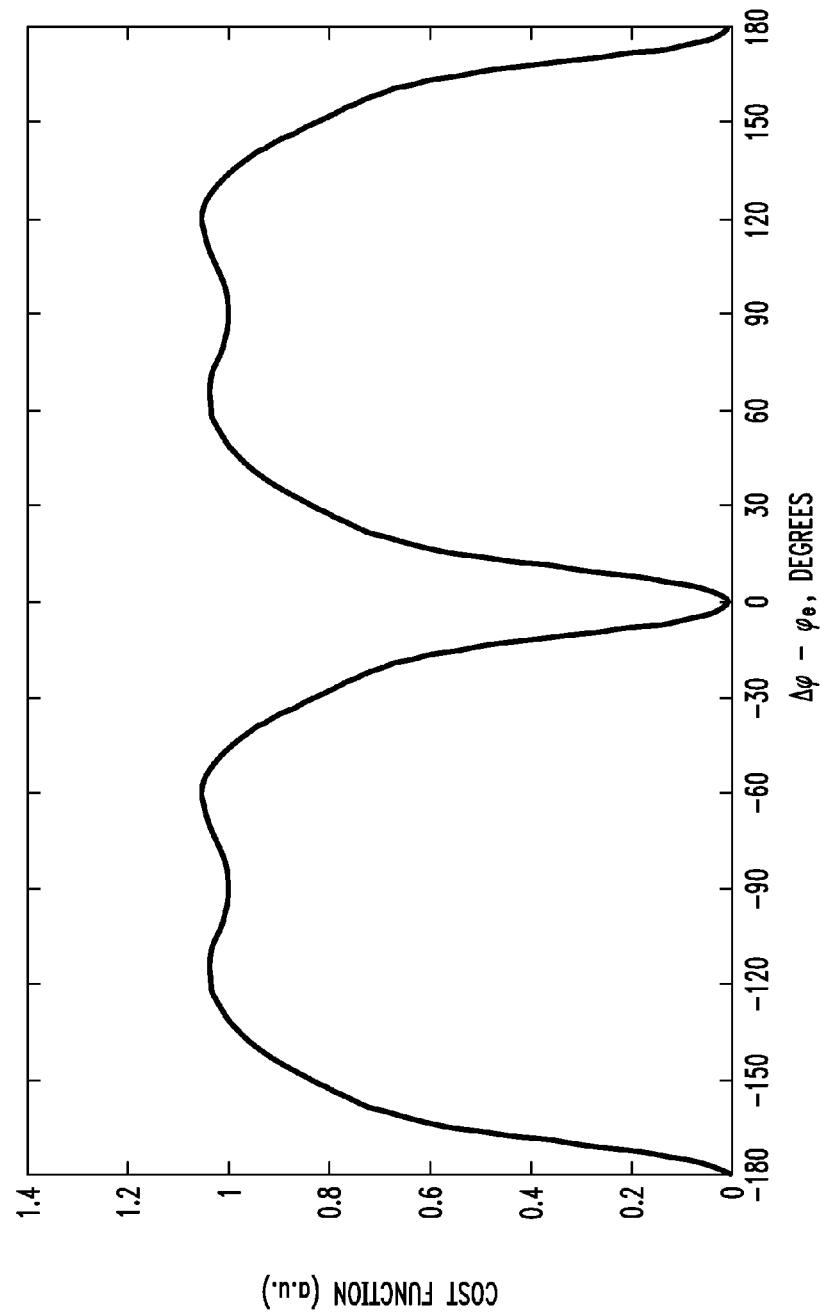
FIG. 5 graphically shows a cost function implemented by the test-phase module of FIG. 4 according to one embodiment of the disclosure.

FIG. 5 graphically shows cost function C implemented by circuit 400 (FIG. 4) according to one embodiment of the disclosure. Note that the abscissa in FIG. 5 is the difference between the estimated phase error ($\Delta\phi$, also see FIG. 3) and the actual phase error $\phi_e$. It is evident that cost function C is periodic, with a (smallest) period of 180 degrees. In accordance with the 180-degree period of cost function C, unwrap circuit 350 (FIG. 3) is configured to apply a phase adjustment value that is an integer multiple of 180 degrees. It should also be noted that, for a conventional QAM signal, a similarly constructed cost function has a (smallest) period of 90 degrees.

It is further evident from FIG. 5 that cost function C has a relatively narrow valley in the vicinity of the zero phase difference. The crosstalk between the I and Q components of the subcarrier that is being processed PEE circuit 300 and the crosstalk between this subcarrier and its neighboring subcarriers are the two major components that determine the observed magnitude of the cost function. These properties of the cost function advantageously enable a properly configured PEE circuit 300 (FIG. 3) to accurately track the actual phase error $\phi_e$, e.g., by minimizing the cost function. DSP 160 (FIG. 1) can then implement appropriate phase-error correction based on the phase error determined in this manner by PEE circuit 300, thereby enabling the DSP to substantially cancel the above-identified crosstalk.

While this invention has been described with reference to illustrative embodiments, this description is not intended to be construed in a limiting sense.

For example, various alternative cost functions may be used instead of the cost function implemented by circuit 400 shown in FIG. 4. A suitable cost function may be sensitive to at least one of (i) crosstalk between in-phase and quadrature components of the modulated subcarrier and (ii) crosstalk between the modulated subcarrier and at least one other modulated subcarrier of the optical MC-OQAM signal, wherein the crosstalk is caused by a phase error in the optical LO signal with respect to a carrier wave of the modulated subcarrier.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention.

What is claimed is:

1. A receiver for an optical input signal having one or more modulated subcarriers, each modulated by symbols of a QAM constellation over a sequence of symbol periods, the receiver comprising:
    an opto-electrical frontend circuit configured to mix the optical input signal with an optical local-oscillator (LO) signal to produce an electrical digital measure of the optical input signal for the sequence; and
    a digital processor being adapted to process the electrical digital measure to recover data carried by each of the modulated subcarriers over the sequence, wherein, for at least one of the modulated subcarriers, the digital processor is configured to:
        generate, for each of a plurality of fixed test phases, a respective value of a cost function, wherein the cost function has a magnitude that is sensitive to at least one of (i) crosstalk between in-phase and quadrature components of the modulated subcarrier and (ii) crosstalk between the modulated subcarrier and at least one other modulated subcarrier of the optical input signal, said crosstalk being caused by a phase error in the optical LO signal with respect to a carrier wave of the modulated subcarrier;
        select one of the fixed test phases based on the generated values of the cost function; and
        compensate for the phase error based on the selected test phase.

2. The receiver of claim 1, wherein the receiver is configured to receive an optical MC-OQAM signal, said optical MC-OQAM signal being the optical input signal.

3. The receiver of claim 1, wherein the cost function is periodic with a smallest period of 180 degrees.

4. The receiver of claim 1, wherein the plurality of fixed test phases extends over a phase interval that is larger than 90 degrees.

5. The receiver of claim 1, wherein the digital processor comprises:
    a plurality of test-phase modules, each configured to use a respective one of the plurality of fixed test phases and further configured to generate a respective value of the cost function corresponding to said one fixed test phase;
    a multiplexer coupled to the plurality of test-phase modules and configured to receive from each of said test-phase modules the respective fixed test phase; and
    a multiplexer-control circuit coupled to the plurality of test-phase modules and configured to receive from each of said test-phase modules the respective value of the cost function, wherein:
        in each of the symbol periods of the sequence, the multiplexer-control circuit is configured to cause the multiplexer to select a fixed test phase corresponding to an optimum value of the cost function in the symbol period; and
        the digital processor is configured to compensate for the phase error based on the test phase selected by the multiplexer.

6. The receiver of claim 5, wherein the digital processor further comprises an unwrap circuit coupled to the output of the multiplexer and configured to adjust the test phase selected by the multiplexer by an integer multiple of 180 degrees.

7. The receiver of claim 6, wherein the unwrap circuit is configured to:
    determine a phase increment in the output of the multiplexer between a current symbol period of the sequence and a preceding symbol period of the sequence;
    compare the determined phase increment with a threshold value; and
    select an adjustment value applied to the test phase selected by the multiplexer based on the comparison.

8. The receiver of claim 7, wherein the unwrap circuit is configured to change the adjustment value by 180 degrees when the phase increment is greater than the threshold value.

9. The receiver of claim 5, wherein the digital processor further comprises a digital filter coupled to the output of the multiplexer and configured to time-average a sequence of the test phases outputted by the multiplexer.

10. The receiver of claim 5, wherein a test-phase module of the plurality comprises:
    a multiplier configured to multiply a digital signal corresponding to the modulated subcarrier by a complex exponential factor corresponding to a respective one of the plurality of fixed test phases;
    a delay circuit coupled to the multiplier and configured to apply a relative time delay of one half of the symbol period to real and imaginary parts of a sequence of products generated by the multiplier;
    a decision circuit configured to map each complex value formed by a synchronous pair of real and imaginary parts in the relatively delayed sequence of products onto the QAM constellation to determine a corresponding trial constellation symbol; and
    a distance-calculating circuit configured to determine a distance measure on a complex plane between each complex value and the corresponding trial constellation symbol, wherein the value of the cost function is based on said distance measure.

11. The receiver of claim 10, wherein the test-phase module further comprises a digital filter coupled to the distance-calculating circuit and configured to time-average a sequence of the distance measures generated by the distance-calculating circuit, wherein the value of the cost function is based on a resulting time-averaged sequence.

12. The receiver of claim 10, wherein the distance measure is a squared distance on the complex plane between the complex value and the corresponding trial constellation symbol.

13. The receiver of claim 1, wherein the digital processor is configured to select different fixed test phases for different subcarriers to compensate for different respective phase errors.

14. A method of processing an optical input signal having one or more subcarriers, each modulated by symbols of a QAM constellation over a sequence of symbol periods, the method comprising:
   mixing the optical input signal with an optical local-oscillator (LO) signal to produce an electrical digital measure of the modulated optical signal for the sequence; and
   processing the electrical digital measure to recover data carried by each of the modulated subcarriers over the sequence, wherein, for at least one of the modulated subcarriers, said processing comprises:
      for each of a plurality of fixed test phases, generating a respective value of a cost function, wherein the cost function has a magnitude that is sensitive to at least one of (i) crosstalk between in-phase and quadrature components of the modulated subcarrier and (ii) crosstalk between the modulated subcarrier and at least one neighboring modulated subcarrier of the optical input signal, said crosstalk being caused by a phase error in the optical LO signal with respect to a carrier wave of the modulated subcarrier;
      selecting one of the fixed test phases based on the generated values of the cost function; and
      compensating for the phase error based on the selected test phase.

15. The method of claim 14, wherein the optical input signal is an optical MC-OQAM signal.

16. The method of claim 14, wherein the cost function is periodic with a smallest period of 180 degrees.

17. The method of claim 14, wherein the plurality of fixed test phases extends over a phase interval that is larger than 90 degrees.

18. The method of claim 14, wherein the processing comprises:
   multiplying a digital signal corresponding to the modulated subcarrier by a complex exponential factor corresponding to a respective one of the plurality of fixed test phases;
   applying a relative time delay of one half of the symbol period to real and imaginary parts of a sequence of products generated in said multiplying step;
   mapping each complex value formed by a synchronous pair of real and imaginary parts in the relatively delayed sequence of products onto the QAM constellation to determine a corresponding trial constellation symbol; and
   determining a distance measure on a complex plane between each complex value and the corresponding trial constellation symbol, wherein the value of the cost function is based on said distance measure.

19. The method of claim 18, wherein the processing further comprises time-averaging a sequence of the distance measures generated using the determining step, wherein the value of the cost function is based on a resulting time-averaged sequence.

20. The method of claim 18, wherein the distance measure is a squared distance on the complex plane between the complex value and the corresponding trial constellation symbol.

* * * * *

UNITED STATES PATENT AND TRADEMARK OFFICE
CERTIFICATE OF CORRECTION

| | | |
|---|---|---|
| PATENT NO. | : 9,112,614 B2 | Page 1 of 1 |
| APPLICATION NO. | : 13/410747 | |
| DATED | : August 18, 2015 | |
| INVENTOR(S) | : Randel et al. | |

It is certified that error appears in the above-identified patent and that said Letters Patent is hereby corrected as shown below:

On the title page item 74; replace "Yuri Gruzokov" with --Yuri Gruzdkov--.

Signed and Sealed this
Twenty-third Day of August, 2016

Michelle K. Lee
*Director of the United States Patent and Trademark Office*